United States Patent Office 3,755,474
Patented Aug. 28, 1973

3,755,474
CONVERSION OF HALOCARBON COMPOUNDS
Geir Bjornson, Bartlesville, Okla., assignor to
Phillips Petroleum Company
No Drawing. Filed July 29, 1970, Ser. No. 58,993
Int. Cl. C07c 17/20
U.S. Cl. 260—653                          10 Claims

ABSTRACT OF THE DISCLOSURE

Perhaloethane compounds in the presence of elemental bromine or chlorine and alkali metal or alkaline earth metal catalysts are converted to halocarbon compounds having a chemical composition different from the feedstock material.

---

This invention relates to chemical processes. Particularly, the invention relates to the catalytic conversion of perhaloethane compounds to form perhalomethanes and perhaloethanes having a chemical composition different from the feedstock.

Perhaloalkanes, i.e., compounds containing carbon atoms which are fully substituted with the same or different halogen atoms, are well known compounds of wide utility, particularly as heat transfer materials, aerosol propellants, solvents and intermediates for polymeric materials. Of these materials, fluorotrichloromethane, dichlorodifluoromethane, chlorotrifluoromethane, trichlorotrifluoroethane and dichlorotetrafluoroethane are the most widely used, the first two being more important. In preparing these materials there are produced significant amounts of halocarbons having a lesser commercial value such as the haloethanes other than dichlorotetrafluoroethane. It is therefore desirable to convert such by-product materials to other more desirable perhalocarbons.

It has now been discovered that perhaloethane feedstocks having at least one halogen on one carbon atom different from at least one halogen on the other carbon atom, for example, 1,1-dichloro-1,2,2,2-tetrafluoroethane or 1,2-dichloro-1,1,2,2-tetrafluoroethane, can be converted to more valuable perhalomethanes and other perhaloethane compounds by a process contacting in the vapor phase and in the presence of a catalyst a selected perhaloethane feedstock with elemental chlorine or bromine, with substantially no formation of compounds having more carbon atoms than the feedstock material.

The process of the invention can be schematically illustrated as proceeding as follows:

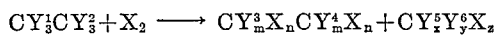

$$CY_3^1CY_3^2 + X_2 \longrightarrow CY_m^3X_nCY_m^4X_n + CY_x^5Y_y^6X_z$$

wherein $Y^{1-6}$, X, m, n, x, y and z are as subsequently defined.

Thus, according to this invention, a perhaloethane feedstock comprising at least one compound having the formula

$$CY_3^1CY_3^2$$

wherein each of $Y^1$ and $Y^2$ can be the same or different and each is selected from the class consisting of fluorine, chlorine, bromine or mixtures thereof and at least one of $Y^1$ is different from at least one of $Y^2$; is contacted with elemental bromine or chlorine in the vapor phase and in the presence of a catalyst selected from the group consisting of alkali metal and alkaline earth metal halides to convert said feedstock to compounds having the formula

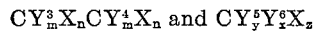

$$CY_m^3X_nCY_m^4X_n \text{ and } CY_y^5Y_z^6X_z$$

wherein each of $Y^3$, $Y^4$, $Y^5$ and $Y^6$ can be the same or different and each is selected from the class consisting of fluorine, chlorine, bromine or mixtures thereof; m is an integer in the range of 1–3; n is an integer in the range of 0–2; m+n is 3; x is an integer in the range of 1–4; y is an integer in the range of 0–3; z is an integer in the range of 0–3; x+y+z is 4; and X is chlorine or bromine; thereby forming perhalocarbons having a lesser number of carbon atoms than the feedstock material as well as halocarbons having the same number of carbon atoms as the feedstock but with a different halogen configuration.

Generally, the practice of the invention contemplates a process for converting perhaloethane feedstocks to perhalomethanes and perhaloethanes having a different chemical composition from the feedstock material which comprises contacting the feedstock material under vapor phase conditions with elemental chlorine or bromine in the presence of an alkali or alkaline earth metal halide catalyst, preferably in combination with a carbon support, and recovering the conversion products. More particularly, the gaseous feedstock material is continuously metered or otherwise fed into a reactor packed with the appropriate catalyst and which may be made of inert materials such as quartz, nickel, Monel, or Inconel, and provided with suitable heating means for reaction zone temperature maintenance. Product recovery may be effected more or less conventionally as in this art. For example, reaction effluent may be passed through a water scrubber, the exit of the scrubber may be dried, and then totally condensed in a receiver or trap by suitable cooling. The resulting condensate may then be fractionally distilled in suitable equipment to facilitate recovery of the product materials.

In accordance with the invention, it has been discovered that alkali metal and alkaline earth metal halides having a melting point above about 1200° F., i.e., a melting point above the selected reaction temperature, are effective in promoting the halogenation of perhaloethane compounds and, in addition, promote halogen transfer and molecular cleavage of perhaloethane compounds thereby transforming such compounds into different halocarbon compounds having an equal number or fewer carbon atoms than the feedstock material and a different halogen configuration than said feedstock material.

The catalysts which are suitable in the practice of the invention include Group I–A and Group II–A metal chlorides, bromides, fluorides and iodides having a melting point above about 1200° F. The Group II–A metal halides, particularly barium chloride, are preferred. The Group I–A and Group II–A metals are those indicated by the Periodic Table found in "Handbook of Chemistry and Physics," Chemical Rubber Company, 45th edition (1964) page B–2. The selected catalysts will have a melting point above the reaction temperature which is required for a particular conversion. Preferably, the alkali metal and alkaline earth metal halide catalysts are employed in combination with a carbon catalytic support or carrier material. The carbon support which can be used in combination with the alkali and alkaline earth metal halide catalysts can be any divided form of carbon such as an activated carbon. Granular size of the support material is not critical. In general, when combined with a carbon support, the metal halide catalyst can comprise in the range of 1–95 weight percent of the total catalytic composition. Preferably, the catalyst will comprise from 1–30 weight percent of metal halide in combination with a carbon support material. Such supported catalyst can be prepared by any means known to the art.

The process of the invention can be effected in a batchwise, semicontinuous or continuous method of operation with the continuous mode being presently perferred. Generally, the catalyst will be charged to the reaction vessel which is preferably purged by an inert gas such as nitrogen prior to the introduction of the gaseous feedstock. When operating according to the preferred continuous mode, the feedstock and elemental halogen will be charged at a space velocity rate (GHSV: volume of gaseous reactant per volume of catalyst per hour) of 500 to 10,000, preferably 2,000 to 4,000, based on feedstock.

The temperatures which can be employed according to the process of this invention are generally in the range of about 1200–1800° F. Preferably, such temperatures will be in the range of 1300–1500° F.; although the optimum temperature in each instance will depend upon the particular feedstock which is desired to be converted. The reaction is normally conducted in the gaseous phase, at pressures such as to maintain the perhaloethane feedstock in the gaseous phase. Thus, reactions can be carried out at substantially atmospheric pressures or with a sufficient positive pressure as necessary to maintain gas flow through the reactor and product recovery system. Generally, such pressures will be in the range of atmospheric to about 10 atmospheres, with a range of 1.5 to 3 atmospheres of pressure being preferred. Subatmospheric or superatmospheric pressures may be employed if desired. Contact times may be varied considerably without noticeable disadvantage to process efficiency. Generally, reaction contact times in the range of about 0.01–1000 seconds are normally suitable, with preferred times being in the range of 0.5 to 60 seconds. For any given operation, optimum correlation of temperature and contact time and pressure may be determined by test runs. In general, the elemental chlorine or bromine is used in at least stoichiometric amounts, that is, at least one mol of elemental chlorine or bromine per mol of perhaloethane feedstock. Thus, the molar ratio of elemental chlorine or bromine to perhaloethane feedstock will be in the range of 1:1 to 10:1, and is preferably in the range of 1.2:1 to 5:1.

The following example is illustrative of the invention.

EXAMPLE

A mixture comprised of 7.8 mol percent 1,1-dichloro-1,2,2,2-tetrafluoroethane and 92.2 mol percent 1,2-dichloro-1,1,2,2-tetrafluoroethane was mixed with chlorine and passed through a quartz tube having an external diameter of 6 mm. and an internal diameter of 4 mm. which was heated over 10 inches of its length in an electrical furnace. The 10-inch portion of the quartz tube which was heated was packed with a catalyst comprised of 27 weight percent barium chloride on a carbon support which had previously been activated by heating for 48 hours at 1200 to 1450° F. The effluent was passed through two scrubbers with potassium hydroxide solution and through a chromatograph where it was analyzed. Control Runs 5, 6 and 7 without catalyst are presented for representative purposes. Data which were obtained are presented in Table I which follows.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

What is claimed is:

1. The process which comprises contacting under vapor phase conditions at a temperature in the range of 1200° F. to about 1800° F. a feedstock consisting essentially of at least one compound having the formula $$CY^1_3CY^2_3$$

in the presence of elemental chlorine or bromine and a catalyst selected from the group consisting of alkali metal and alkaline earth metal halides to form a reaction product comprising a compound having the formula $$CY^3_m X_n CY^4_m X_n$$

wherein each of $Y^1$ and $Y^2$ can be the same or different and each is selected from the class consisting of fluorine, chlorine, bromine or mixtures thereof and at least one of of $Y^1$ is different from at least one of $Y^2$; and wherein each of $Y^3$ and $Y^4$ can be the same or different and each is selected from the group consisting of fluorine, chlorine, bromine or mixtures thereof; $m$ is an integer between 1–3; $n$ is zero, 1 or 2; $m+n$ is 3; and wherein X is selected from the class consisting of chlorine or bromine.

2. The process according to claim 1 wherein said reaction product further comprises a compound having the formula $$CY^5_x Y^6_y X_z$$

wherein each of $Y^5$ and $Y^6$ can be the same or different and each is selected from the class consisting of fluorine, chlorine, bromine or mixtures thereof; $x$ is an integer in the range of 1 to 4; $y$ is an integer in the range of 0 to 3; $z$ is an integer in the range of 0 to 3; and $x+y+z$ is 4; and X is as previously defined.

3. The process according to claim 1 wherein said catalyst consists essentially of at least one alkali metal or alkaline earth metal halide in association with a carbon catalytic carrier material.

4. The process according to claim 3 wherein said catalyst is selected from the group consisting of alkaline earth metal halides.

5. The process according to claim 4 wherein said catalyst is barium chloride.

TABLE I

| Run No. | Temperature, °F. | $CCl_2FCF$ and $CClF_2CClF_2$ flow rate, s.c.i.m.[1] | $Cl_2$ flow rate, s.c.i.m. | Conversion, percent, $C_2$ basis | Selectivity to—[2] | | | | | |
|---|---|---|---|---|---|---|---|---|---|---|
| | | | | | $CCl_4$ | $CCl_3F$ | $CCl_2F_2$ | $CClF_3$ | $CCl_2F$-$CClF_2$ | $CClF_2CF_3$ |
| 1 | 1,450 | 1 | 3 | 23.54 | 2.0 | 12.5 | 68.2 | 13.9 | 2.0 | 1.4 |
| 2 | 1,400 | 1 | 3 | 20.51 | 1.7 | 10.9 | 67.2 | 16.8 | 2.0 | 1.4 |
| 3 | 1,300 | 1 | 3 | 1.80 | 3.0 | 2.8 | 72.5 | 14.2 | 25.3 | |
| 4 | 1,200 | 1 | 3 | 0.23 | 3.6 | | 60.4 | 10.7 | | |
| 5[3] | 1,450 | 1 | 3 | 7.2 | | 2.9 | 94.4 | 2.7 | | |
| 6[3] | 1,400 | 1 | 3 | 2.3 | | 1.7 | 96.1 | 2.2 | | |
| 7[3] | 1,300 | 1 | 3 | No reaction | | | | | | |

[1] S.c.i.m. is standard cubic inches per minute.
[2] The selectivities are based on carbon.
[3] Control.

The foregoing example demonstrates the effectiveness of the process of this invention in converting perhaloethane feedstock material containing at least one halogen atom on one carbon atom which is different from at least one halogen atom on the second carbon atom to different perhaloethane materials and to perhalomethane compounds.

6. The process of claim 5 wherein 1,2-dichloro-1,1,2,2-tetrafluoroethane is contacted with elemental chlorine in the presence of barium chloride at a temperature in the range of 1200 to 1800° F. to form a reaction product comprising 1,1,2-trichloro-1,2,2-trifluoroethane.

7. The process of claim 6 wherein said reaction product further comprises dichlorodifluoromethane.

8. The process of claim 5 wherein said feedstock consists essentially of a mixture of 1,2-dichloro-1,1,2,2-tetrafluoroethane and 1,1 - dichloro-1,2,2,2-tetrafluoroethane and said temperature is in the range of 1300 to 1500° F.

9. The process of claim 8 wherein said reaction product further comprises dichlorodifluoromethane.

10. The process of claim 8 wherein said reaction product comprises dichlorodifluoromethane, fluorotrichloromethane, chlorotrifluoromethane and 1,1,2-trichloro-1,2,2-trifluoroethane.

References Cited

UNITED STATES PATENTS

| | | | |
|---|---|---|---|
| 3,278,616 | 10/1966 | Mod | 260—653 |
| 3,558,723 | 1/1971 | Davis et al. | 260—653 |

DANIEL D. HORWITZ, Primary Examiner

U.S. Cl. X.R.

260—658 R